(12) United States Patent
Winbladh et al.

(10) Patent No.: US 8,374,168 B2
(45) Date of Patent: Feb. 12, 2013

(54) TELEPHONE COMMUNICATION

(75) Inventors: Hjalmar Winbladh, Saltsjö-Boo (SE); Jonas Lindroth, Stockholm (SE)

(73) Assignee: Rebtel Networks AB, Nacka Strand (SE)

( * ) Notice: Subject to any disclaimer, the term of this patent is extended or adjusted under 35 U.S.C. 154(b) by 849 days.

(21) Appl. No.: 12/300,278

(22) PCT Filed: Mar. 12, 2007

(86) PCT No.: PCT/SE2007/050142
§ 371 (c)(1),
(2), (4) Date: Aug. 17, 2009

(87) PCT Pub. No.: WO2007/129967
PCT Pub. Date: Nov. 15, 2007

(65) Prior Publication Data
US 2009/0310598 A1    Dec. 17, 2009

(30) Foreign Application Priority Data
May 10, 2006    (SE) ..................... 0601045

(51) Int. Cl.
*H04L 12/66*    (2006.01)
*H04M 1/64*    (2006.01)
*H04M 1/56*    (2006.01)
*H04M 3/42*    (2006.01)

(52) U.S. Cl. .......... 370/352; 379/88.2; 379/88.21; 379/142.01; 455/415

(58) Field of Classification Search .......... 370/352–356; 379/142.01, 142.06, 88.1–88.21; 455/415
See application file for complete search history.

(56) References Cited

U.S. PATENT DOCUMENTS
4,191,860 A    3/1980    Weber
(Continued)

FOREIGN PATENT DOCUMENTS
EP    0 740 480 A2    10/1996
EP    1 085 738 A2    3/2001
(Continued)

OTHER PUBLICATIONS

John Alexander et al., *Cisco CallManager Fundamentals*, (Cisco Press 2002) (entire book).
(Continued)

*Primary Examiner* — Chandrahas Patel
*Assistant Examiner* — Joel Hamel
(74) *Attorney, Agent, or Firm* — Alston & Bird LLP

(57) ABSTRACT

A telephone connection is established between a first terminal and a second terminal. The first terminal is presumed to be associated with a subscription in a first home telephone network in which the terminal is identified by a first network identity. Correspondingly, the second terminal is presumed to be associated with a subscription in a second home telephone network in which the second terminal is identified by a second network identity. A host resource routes a call from the first terminal to the second terminal based on a combination of the first network identity and a first common telephone number in the first home telephone network dialed by the first terminal. The first common telephone number is selected such that it is unique and is adapted to be shared among a group of users in the first home telephone network.

12 Claims, 2 Drawing Sheets

U.S. PATENT DOCUMENTS

| | | | |
|---|---|---|---|
| 4,277,649 A | 7/1981 | Sheinbein |
| 4,585,906 A | 4/1986 | Matthews et al. |
| 4,625,081 A | 11/1986 | Lotito et al. |
| 4,757,267 A | 7/1988 | Riskin |
| 5,029,196 A | 7/1991 | Morganstein |
| 5,029,199 A | 7/1991 | Jones et al. |
| 5,136,636 A | 8/1992 | Wegrzynowicz |
| 5,259,024 A | 11/1993 | Morley, Jr. et al. |
| 5,267,307 A | 11/1993 | Izumi et al. |
| 5,276,731 A | 1/1994 | Arbel et al. |
| 5,311,572 A | 5/1994 | Friedes et al. |
| 5,325,424 A | 6/1994 | Grube |
| 5,353,331 A | 10/1994 | Emery et al. |
| 5,353,335 A | 10/1994 | D'Urso et al. |
| 5,425,084 A | 6/1995 | Brinskele |
| 5,450,479 A | 9/1995 | Alesio et al. |
| 5,452,350 A | 9/1995 | Reynolds et al. |
| 5,457,732 A | 10/1995 | Goldberg |
| 5,465,295 A | 11/1995 | Furman |
| 5,473,677 A | 12/1995 | D'Amato et al. |
| 5,506,897 A | 4/1996 | Moore et al. |
| 5,533,107 A | 7/1996 | Irwin et al. |
| 5,546,452 A | 8/1996 | Andrews et al. |
| 5,559,860 A | 9/1996 | Mizikovsky |
| 5,574,780 A | 11/1996 | Andruska et al. |
| 5,579,379 A | 11/1996 | D'Amico et al. |
| 5,583,926 A | 12/1996 | Venier et al. |
| 5,588,048 A | 12/1996 | Neville |
| 5,644,629 A | 7/1997 | Chow |
| 5,646,982 A | 7/1997 | Hogan et al. |
| 5,661,791 A | 8/1997 | Parker |
| 5,673,310 A | 9/1997 | Andruska et al. |
| 5,748,709 A | 5/1998 | Sheerin |
| 5,758,279 A | 5/1998 | Foti |
| 5,802,160 A | 9/1998 | Kugell et al. |
| 5,802,471 A | 9/1998 | Sawai et al. |
| 5,802,513 A | 9/1998 | Bowie, III |
| 5,805,684 A | 9/1998 | Hirose et al. |
| 5,822,416 A | 10/1998 | Goodacre et al. |
| 5,825,863 A | 10/1998 | Walker |
| 5,844,972 A | 12/1998 | Jagadish et al. |
| 5,854,975 A | 12/1998 | Fougnies et al. |
| 5,859,901 A | 1/1999 | Brendzel et al. |
| RE36,111 E | 2/1999 | Neville |
| 5,867,495 A | 2/1999 | Elliott et al. |
| 5,875,401 A | 2/1999 | Rochkind |
| 5,878,126 A | 3/1999 | Velamuri et al. |
| 5,878,130 A | 3/1999 | Andrews et al. |
| 5,884,972 A | 3/1999 | Deptolla |
| 5,903,636 A | 5/1999 | Malik |
| 5,909,650 A | 6/1999 | Jonsson |
| 5,923,745 A | 7/1999 | Hurd |
| 5,953,405 A | 9/1999 | Miloslavsky |
| 5,995,824 A | 11/1999 | Whitfield |
| 5,999,525 A | 12/1999 | Krishnaswamy et al. |
| 6,011,975 A | 1/2000 | Emery et al. |
| 6,032,039 A | 2/2000 | Kaplan |
| 6,035,025 A | 3/2000 | Hanson |
| 6,075,854 A | 6/2000 | Copley et al. |
| 6,125,174 A | 9/2000 | Watanabe |
| 6,154,532 A | 11/2000 | Lockhart et al. |
| 6,157,831 A | 12/2000 | Lamb |
| 6,160,877 A | 12/2000 | Tatchell et al. |
| 6,163,597 A | 12/2000 | Voit |
| 6,173,049 B1 | 1/2001 | Malik |
| 6,175,622 B1 | 1/2001 | Chiniwala et al. |
| 6,195,419 B1 | 2/2001 | Gilboy |
| 6,195,422 B1 | 2/2001 | Jones et al. |
| 6,240,170 B1 | 5/2001 | Shaffer et al. |
| 6,246,757 B1 | 6/2001 | Cai et al. |
| 6,292,553 B1 | 9/2001 | Fellingham et al. |
| 6,308,070 B1 | 10/2001 | Laster |
| 6,324,263 B1 | 11/2001 | Sherwood et al. |
| 6,327,359 B1 | 12/2001 | Kang et al. |
| 6,356,630 B1 | 3/2002 | Cai et al. |
| 6,374,302 B1 | 4/2002 | Galasso et al. |
| 6,381,315 B1 | 4/2002 | Nhaissi |
| 6,442,243 B1 | 8/2002 | Valco et al. |
| 6,463,145 B1 | 10/2002 | O'Neal et al. |
| 6,507,644 B1 | 1/2003 | Henderson et al. |
| 6,522,743 B1 | 2/2003 | Hurd |
| 6,535,596 B1 | 3/2003 | Frey et al. |
| 6,539,089 B1 | 3/2003 | Mahajan |
| 6,614,887 B1 | 9/2003 | Satapathy et al. |
| 6,665,390 B1 | 12/2003 | Ekstrom |
| 6,665,532 B1 | 12/2003 | Boland et al. |
| 6,681,119 B1 | 1/2004 | Verdonk |
| 6,690,779 B2 | 2/2004 | Walker et al. |
| 6,697,484 B1 | 2/2004 | Fleming, III |
| 6,738,636 B2 | 5/2004 | Lielbriedis |
| 6,744,874 B2 | 6/2004 | Wu |
| 6,760,324 B1 | 7/2004 | Scott et al. |
| 6,771,953 B1 | 8/2004 | Chow et al. |
| 6,779,020 B1 | 8/2004 | Henrick |
| 6,788,927 B2 | 9/2004 | Pohutsky et al. |
| 6,795,852 B1 | 9/2004 | Kleinrock et al. |
| 6,798,876 B1 | 9/2004 | Bala |
| 6,813,504 B2 | 11/2004 | Benchetrit et al. |
| 6,873,690 B2 | 3/2005 | Moon et al. |
| 6,920,487 B2 | 7/2005 | Sofer et al. |
| 6,937,713 B1 | 8/2005 | Kung et al. |
| 6,963,638 B1 | 11/2005 | Keller |
| 6,970,541 B2 | 11/2005 | Bates et al. |
| 6,999,575 B1 | 2/2006 | Sheinbein |
| 7,016,343 B1 | 3/2006 | Mermel et al. |
| 7,042,994 B2 | 5/2006 | Hanna et al. |
| 7,103,163 B1 | 9/2006 | Cook |
| 7,103,168 B2 | 9/2006 | Bedingfield, Sr. et al. |
| 7,127,051 B2 | 10/2006 | Bedingfield et al. |
| 7,133,508 B1 | 11/2006 | Parsa et al. |
| 7,197,560 B2 | 3/2007 | Caslin et al. |
| 7,218,721 B1 | 5/2007 | Vincent et al. |
| 7,289,522 B2 | 10/2007 | Gallant |
| 7,295,658 B2 | 11/2007 | Moon et al. |
| 7,315,738 B1 | 1/2008 | Delker et al. |
| 7,346,156 B1 | 3/2008 | Choupak et al. |
| 7,386,111 B2 | 6/2008 | Holder |
| 7,567,662 B1 * | 7/2009 | Renner et al. ............ 379/202.01 |
| 7,680,262 B2 | 3/2010 | Holder |
| 2001/0000808 A1 | 5/2001 | Lesley |
| 2001/0028705 A1 | 10/2001 | Adams et al. |
| 2002/0025028 A1 | 2/2002 | Manto |
| 2002/0055351 A1 | 5/2002 | Elsey et al. |
| 2002/0057783 A1 | 5/2002 | Kredo et al. |
| 2002/0097854 A1 | 7/2002 | Bauer |
| 2002/0131574 A1 | 9/2002 | Alleman |
| 2002/0137503 A1 | 9/2002 | Roderique |
| 2002/0146103 A1 | 10/2002 | Holt et al. |
| 2002/0164978 A1 | 11/2002 | Moskowitz et al. |
| 2002/0165969 A1 | 11/2002 | Gallant |
| 2003/0043984 A1 | 3/2003 | Lauzon |
| 2003/0076940 A1 | 4/2003 | Manto |
| 2003/0081751 A1 * | 5/2003 | Berstis ............ 379/202.01 |
| 2003/0119492 A1 | 6/2003 | Timmins et al. |
| 2003/0144013 A1 | 7/2003 | Benchetrit et al. |
| 2003/0174822 A1 | 9/2003 | Moon et al. |
| 2003/0198326 A1 | 10/2003 | Wei |
| 2004/0022384 A1 | 2/2004 | Flores et al. |
| 2004/0028208 A1 | 2/2004 | Carnazza et al. |
| 2004/0038706 A1 | 2/2004 | Wasser |
| 2004/0048606 A1 | 3/2004 | Heinmiller et al. |
| 2004/0151292 A1 | 8/2004 | Larsen |
| 2004/0203794 A1 | 10/2004 | Brown et al. |
| 2004/0213391 A1 | 10/2004 | Yau et al. |
| 2004/0235509 A1 * | 11/2004 | Burritt et al. ................ 455/519 |
| 2005/0002508 A1 | 1/2005 | Elsey et al. |
| 2005/0020270 A1 | 1/2005 | Buckley |
| 2005/0060262 A1 | 3/2005 | Kunugi et al. |
| 2005/0101303 A1 | 5/2005 | Pelaez et al. |
| 2006/0078100 A1 | 4/2006 | Risafi et al. |
| 2006/0135137 A1 | 6/2006 | Chung |
| 2007/0032225 A1 | 2/2007 | Konicek et al. |
| 2007/0238472 A1 | 10/2007 | Wanless |

FOREIGN PATENT DOCUMENTS

| | | |
|---|---|---|
| EP | 1 267 556 A2 | 12/2002 |
| EP | 1267556 A2 | 12/2002 |

| | | | |
|---|---|---|---|
| JP | 11-136338 A | 5/1999 | |
| JP | 11-243582 A | 9/1999 | |
| JP | 2001-045540 A | 2/2001 | |
| JP | 2001-268209 A | 9/2001 | |
| WO | WO 95/06381 A1 | 3/1995 | |
| WO | WO 9506381 A1 | 3/1995 | |
| WO | WO 00/01137 A1 | 1/2000 | |
| WO | WO 00/60840 A2 | 10/2000 | |
| WO | WO 03/028355 A1 | 4/2003 | |
| WO | WO 2009/116991 A1 | 9/2009 | |

OTHER PUBLICATIONS

Tom Keating, *Variety-Pack CTI*, CTI Magazine (Oct. 1997), 5 pages.

Jonathan Lennox et al., *Implementing Intelligent Network Services with the Session Initiation Protocol*, Tech-Report No. CUCS-002-99, (1999), pp. 0-25.

Betty Yuan, *The New ABCs of ACDS*, Call Center Magazine (1999), [online] [retrieved May 6, 2010]. Retrieved from the Internet: URL: file://C:\documents and Settings/jlucas/Local Settings\Temporary Internet Files\OLK1646\.... 9 pages.

Alessandra Andreetto et al., *Ubiquitous Communication Over IN and Internet* (2000), 6 pages.

Richard Stastny, *Service Opportunities: From UPT and ENUM to UCI?*, presented at Ecma TG17 (Jun. 2001), 25 pages.

Geoff Huston, *ENUM—Mapping the E.164 Number Space into the DNS* (2002), pp. 1-10.

Stephan Rupp et al., *Flexible Universal Networks—A New Approach to Telecommunication Services?*, [online] [retrieved May 7, 2010]. Retrieved from the Internet: <URL: http://portal.acm.org/citation.cfm?id=1015017>. 3 pages.

CT-Connect Manual, Dialogic Corp. (1998), 28 pages.

*Call Centres and CTI—The GeoTel Communications Corporation*, Competitor Brief (Datamonitor Aug. 1998), [online] [retrieved May 14, 2010]. Retrieved from the Internet: <URL: http://www.callcentres.com.au/geotel.htm>. 8 pages.

*Microsoft to Acquire Sendit*, Microsoft press release, Jul. 1, 1999, [online] [retrieved May 14, 2010]. Retrieved from the Internet: <URL: http://www.microsoft.com/presspass/features/1999/07-01sendit.mspx>. 1 page.

*Microsoft Announces Shareholder Acceptance of Offer to Acquire Sendit*, Microsoft press release, Jul. 1, 1999, [online] [retrieved Jul. 16, 2010]. Retrieved from the Internet: <URL: http://www.microsoft.com/presspass/press/1999/jul99/senditpr.mspx>. 2 pages.

*Collaboration in Creating the Mobile Internet Environment of the Future*, Nokia press release, Jan. 13, 1997, [online] [retrieved May 14, 2010]. Retrieved from the Internet: <URL: http://press.nokia.com/PR/199701/775490_5.html>. 2 pages.

State of California—Rider B/800 Enhanced Call Routing (ECR), [online] [retrieved Jul. 16, 2010]. Retrieved from the Internet: <URL: https://ebiznet.sbc.com/calnetinfo/MCI_B/800ENHAN.htm>. 7 pages.

*SendIt Selects Natural MicroSystems for Enhanced 'Wireless Internet' Services Platform*, Business Wire, Feb. 8, 1999, [online] [retrieved May 14, 2010]. Retrieved from the Internet: <URL: http://findarticles.com/p/articles/mi_m0EIN/is_1999_Feb_8/ai_53720270/>. 3 pages.

*SENDIT: Swedish GSM Operator Europolitan Signs Upgrade Order for ICSA*, M2 Presswire, Mar. 1999, [online] [retrieved May 14, 2010]. Retrieved from the Internet: <URL: http://findarticles.com/p/articles/mi_hb5243/is_199903/ai_n20254452/>. 1 page.

*Greece's Cosmote Announces Mobile Internet Services Built on Microsoft Technology*, Microsoft press release, Oct. 25, 2000, [online] [retrieved May 14, 2010]. Retrieved from the Internet: <URL: http://www.microsoft.com/Presspass/press/2000/oct00/cosmotepr.mspx. 2 pages.

*First Wireless E-mail Application* (at p. 33), Smart Card News, vol. 7, No. 2, Feb. 1998, pp. 23-40.

Robert J. Crawford et al., *Case Study of Microsoft's Acquisition of Sendit* (INSEAD 2003), 61 pages.

Henning Schulzrinne, *SIP for Mobility*, presented at Conference International—SIP, Paris, France (Feb. 21, 2001), 23 pages.

Robert Houron, *Compaq, Mobility—Creating an Untethered World*, presented at 1998 Worldwide Telecommunications Forum (2008).

John Anderson, *Intelligent Networks: Principles and Applications* (*Telecommunications series No. 46*) (2002).

Ollie Martikainen et al., *Tutorial on Intelligent Networks*, presented at International Federation for Information Processing's "IFIP in '95" conference (1995).

\* cited by examiner

TELEPHONE COMMUNICATION

THE BACKGROUND OF THE INVENTION AND PRIOR ART

The present invention relates generally to cost efficient communication solutions. More particularly the invention relates to a system for establishing a telephone connection according to the preamble of claim 1 and a corresponding method according to the preamble of claim 7. The invention also relates to a computer program product according to claim 13 and a computer readable medium according to claim 14.

The advent of the Internet has created a new medium through which data can be exchanged very cost efficiently over vast distances. Recently, numerous designs have also been presented that enable telephone traffic to be effected via the Internet. Thus, the otherwise so expensive long distance rates can be reduced significantly. However, the known solutions in this area are disadvantageous for various reasons, primarily with reference to lack of compatibility. Namely, either a dedicated Internet service must be used, such as MSN® or Skype™, or tailormade terminals are required. In both cases it becomes relatively complicated and/or expensive to make and receive phone calls to/from users who are not subscribes to the same service as the other party. Alternatively, so-called double dialing or dial-through may be employed. This means that the caller first dials a local access number, and thereafter enters a pause sign (or equivalent character, e.g. represented by a "P") plus an international number to the callee. One major drawback with this approach is that it is comparatively complicated to store the callee's number in a conventional software telephone book of the user terminal because different terminals may use different notation standards and different network operators may require different formats to invoke the service.

Of course, if a local telephone number were registered in each region/country where a user has friends, relatives, business partners etc. who the user wishes to offer an inexpensive calling alternative, and if all calls to any of these numbers were routed to the user's home subscription, the user could be reached on a local call rate "irrespective" of the caller's location. Nevertheless, such a solution would only be cost efficient for the callers, since maintaining and administrating the local telephone numbers is relatively expensive for the callee, particularly if he/she desires local numbers in many countries/regions.

The US patent publication No. 2006/0003770 discloses a solution for routing telephone calls to and from wireless phones using a low cost communications network other than a traditional telephone circuit switched network, e.g. the Internet. Here, a virtual phone client is implemented in the wireless phone for communication with a virtual phone server accessible via the wireless network. To effect calls, the client also communicates with an Internet gateway identified by the server. However, having to install the virtual phone client in the user terminal renders the solution inflexible. The network coverage is also comparatively limited. Moreover, the routing and billing schemes become relatively complex.

Providing caller identification may be complicated when routing telephone calls over the Internet. The US patent publication No. 2004/0048606 describes one example of a solution to this specific problem.

Still, the problem of interconnecting standard-type telephones (with POTS/wireless subscriptions) via the Internet in a manner being both cost efficient and technically feasible remains to be solved.

SUMMARY OF THE INVENTION

The object of the present invention is therefore to solve the above problems, as well as to provide a solution for telephone services, which is user-friendly, straightforward and reliable.

According to the invention, the object is achieved by the system as initially described, wherein the system includes a host resource adapted to route a call from the first terminal to the second terminal based on a unique combination of the first network identity and a first common telephone number in the first home telephone network dialed by the first terminal. The first common telephone number is here adapted to be shared among a first group of users in the first home telephone network. The system also includes a first interface node connecting the first home telephone network to at least one interconnecting network, and a second interface node connecting the second home telephone network to at least one of the at least one interconnecting network. Here, it is presumed that at least one of the at least one interconnecting network is represented by a packet switched network. Moreover, each of the a first and second interface nodes is adapted to handle telephone traffic over packet switched networks.

One important advantage of this system is that a user in the system can be conveniently called via a local number from each predefined caller. The overall fixed costs can also be held low, since a relatively small number of common telephone numbers (i.e. switchboard numbers) can be shared among a very large group of users. Furthermore, the Internet can be used to bridge any distances between the communicating parties at a constant and low rate.

According to one preferred embodiment of the invention, the host resource is adapted to route calls from each of a first number of first terminals in the first home telephone network to each of a second number of second terminals in the second home telephone network. To this aim, the host resource is associated with a database that stores one entry for each unique combination of: (i) the first network identity of each of the first terminals, (ii) the second network identity of each of the second terminals, and (iii) a respective first common telephone number to be dialed by each first terminal to reach each of the second terminals. Hence, looking up an intended callee/terminating terminal based on the first network identity (e.g. the caller's CLI (calling line identifier)) and the first common telephone number becomes very straightforward.

According to yet another preferred embodiment of the invention, after having routed said call, the host resource is adapted to set up a bi-directional primary connection between the first terminal and the second terminal after having routed said call provided that a call-accept message is generated by the second terminal. Thus, a conventional telephone conversation can be initiated.

According to a further preferred embodiment of the invention, the primary connection includes a first leg between the first terminal and the host resource, and a second leg between the host resource and the second terminal. Moreover, the host resource is adapted to: receive a termination request from the second terminal, and in response thereto disconnect the second leg, while maintaining the first leg during a threshold period. If a return call to a predefined telephone number associated with the first leg is received from the second terminal before expiry of the threshold period, the host resource is adapted to establish a bi-directional secondary connection between the first terminal and the second terminal. This modus operandi is highly desirable because thereby both subscribers can be connected at a very low cost (typically a local telephone rate).

According to still another preferred embodiment of the invention, at least one of the first and second home telephone networks is a wireless network, and consequently one or both of the originating and the second terminal is a wireless/cell/mobile phone. Hence, an improved flexibility is attained.

According to another aspect of the invention the object is achieved by the method described initially, wherein a dialing code is received from the first terminal. The dialing code identifies a first common telephone number in the first home telephone network. The first common telephone number, in turn, is adapted to be shared among a first group of users in the first home telephone network. The method involves receiving user data specifying the first network identity, and routing a call from the first terminal to the second terminal based on a unique combination of the first common telephone number and the first network identity. The method also involves setting up a bi-directional primary connection between the first terminal and the second terminal provided that a call-accept message is generated by the second terminal. The primary connection is established via at least one interconnecting network of packet switched type.

The advantages of this method, as well as the preferred embodiments thereof, are apparent from the discussion hereinabove with reference to the proposed system.

According to one preferred embodiment of this aspect of the invention, the unique combination of the first common telephone number and the first network identity is established in the host resource by means of the following procedure. First, an initial dialing instruction is received from the second terminal. The initial dialing instruction contains data, which uniquely identifies the first terminal. User data specifying the second network identity is received. Then, the first network identity is derived based on the initial dialing instruction. Thereafter, the first common telephone number is allocated based on the first and second network identities and any first common telephone numbers previously allocated to the first terminal and/or the second terminal in such a manner that a combination of the first network identity, the first common telephone number and the second network identity becomes unique. An entry is stored, which represents said unique combination, and finally, the method involves sending a service invitation message to the first terminal. The service invitation message includes data specifying an identity of the second terminal and the first common telephone number. Thereby, a (supposed) call-originating terminal is provided with a versatile access instrument to the second terminal.

According to another embodiment of this aspect of the invention, the allocation of the first common telephone number involves: investigating whether there exists an already stored entry in respect of the second terminal, and investigating whether there exists an already stored entry in respect of the first terminal. If no previously stored entry exists in respect of either of the first terminal and the second terminal, the first common telephone number is allocated by arbitrarily selecting one number from a predefined pool of telephone numbers in the first network. If there exists at least one stored entry in respect of the second terminal, however there exists no stored entry in respect of the first terminal, the first common telephone number is allocated to a number being identical to an already stored first common telephone number. If there exists at least one previously stored entry in respect of each of the originating and the second terminal, the first common telephone number is allocated to a number adjoining (incrementally or decrementally) an already stored first common telephone number in respect of the first terminal. Hence, a series of common telephone numbers is created, which appears intuitive to the users of the system.

According to yet another embodiment of this aspect of the invention, the first unique combination of the first common telephone number and the first network identity is instead established in the host resource by means of the following procedure. First, an initial service request is received from the second terminal. The initial service request contains data that uniquely identifies the first terminal. User data specifying the second network identity is also received. Then, the first network identity is derived based on the initial service request. Subsequently, an identity-number pair is allocated, which represents the first unique combination. However, additionally, the identity-number pair contains a second common telephone number in the second home telephone network. The second common telephone number, in turn, is adapted to be used for routing a call from the second terminal to the first terminal based on a second unique combination of the second common telephone number and the second network identity. Analogous to the first common telephone number, the second common telephone number is adapted to be shared among a second group of users in the second home telephone network. Hence, calls may be set up in both directions between the first and second terminals at local call rate, irrespective of the geographical distance separating these devices.

According to a further aspect of the invention the object is achieved by a computer program product, which is directly loadable into the memory of a computer, and includes software for controlling the method proposed above when said program is run on a computer.

According to another aspect of the invention the object is achieved by a computer readable medium, having a program recorded thereon, where the program is to control a computer to perform the method proposed above.

Further advantages, beneficial features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF EMBODIMENTS OF THE INVENTION

Figure 1:
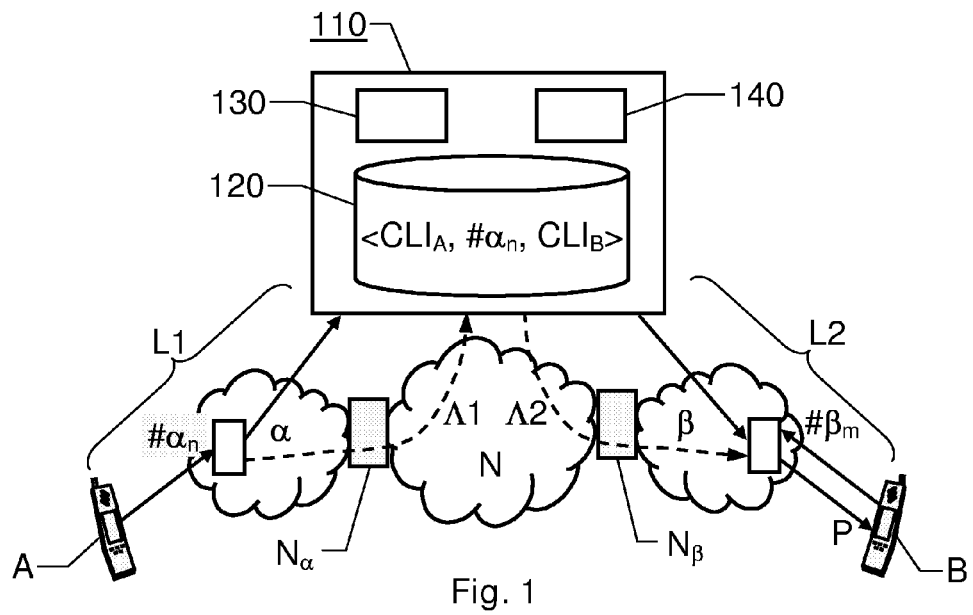
FIG. 1 shows a block diagram of a communications system according to one embodiment of the invention.

FIG. 1 shows a block diagram of a communications system according to one embodiment of the invention. The system is adapted to establish a telephone connection between a first terminal A and a second terminal B. We assume that the first terminal A is associated with a subscription in a first home telephone network α. The first terminal A is here identified by means of a first network identity $CLI_A$, typically in the form of a so-called calling line identifier. We further assume that the second terminal B is associated with a subscription in a second home telephone network β in which the terminal B is identified by means of a second network identity $CLI_B$. One or both the terminals A and B may be a fixed telephone (e.g. of POTS type, POTS=plain old telephone service). However, at least one of the terminals A and B may equally well be a wireless terminal (e.g. a mobile phone having a subscription with a PLMN operator, PLMN=public land mobile network). Naturally, depending on whether the terminals A and/or B are fixed or wireless, at least one of the networks α and β may be a fixed network, and at least one of the networks α and β may be a wireless network that each is adapted to carry circuit switched telephone traffic.

The system includes a host resource 110, which is adapted to route a call from the first terminal A to the second terminal B in a manner being essentially reverse to conventional routing strategies. Namely, the host resource 110 routes the call based on a unique combination of the first network identity $CLI_A$ (designating the caller) and a first common telephone number $\#\alpha_n$ in the first home telephone network α dialed by the first terminal A. The first common telephone number $\#\alpha_n$, as such, is however adapted to be shared among a first group of users in the first home telephone network α. Preferably, the number $\#\alpha_n$ is a switchboard type of telephone number being associated with a plurality of lines, such that the number can be used by many contemporaneous callers. In any case, the number $\#\alpha_n$ is an ordinary telephone number in the sense that it can be stored in a conventional software telephone book of a user terminal.

In order to handle large groups of users, i.e. callers/callees, it is preferable if the host resource 110 is adapted to route calls from each of a first number of first terminals A in the first home telephone network α to each of a second number of second terminals B in the second home telephone network β. To this aim, the host resource 110 is associated with a database 120, which stores one entry $<CLI_A, \#\alpha_n, CLI_B>$ for each unique combination of: the first network identity $CLI_A$ of each of the first terminals A; the second network identity $CLI_B$ of each of the second terminals B; and a respective first common telephone number $\#\alpha_n$ to be dialed by each first terminal A to reach each of the second terminals B. Of course, the entries $<CLI_A, \#\alpha_n, CLI_B>$ need not be defined between all combinations of originating and second terminals A and B respectively. Instead, it is preferable that the entries $<CLI_A, \#\alpha_n, CLI_B>$ are created on an invitation basis, so that entries defining telephone numbers to a particular second terminal B are exclusively created in respect of subscriptions designated by a subscriber who has this terminal B at his/her disposal. Thus, identified friends, relatives, business partners and others can reach the subscriber with the terminal B via the proposed system. A combined procedure for inviting subscribers and creating the entries $<CLI_A, \#\alpha_n, CLI_B>$ according to one preferred embodiment of the invention will be described below with reference to FIG. 2.

According to one preferred embodiment of the invention, the system includes a first interface node $N_\alpha$, which connects the first home telephone network a to at least one interconnecting network N. The system also includes a second interface node $N_\beta$, which connects the second home telephone network β to at least one of the at least one interconnecting network N. Preferably, the networks α and β are thereby interconnected via at least one interconnecting network N being packet switched network, e.g. the Internet. In such a case, each of the first and second interface nodes $N_\alpha$ and $N_\beta$ is adapted to handle telephone traffic over packet switched networks, e.g. according to Open SIP (session initiation protocol). Thereby, a telephone connection may be established between the terminals A and B, which is partially realized over the Internet. This, in turn, vouches for cost efficiency, especially if the physical distance between the terminals A and B is long.

Regardless of the protocol used in the interconnecting network(s) N the host resource 110 is also connected thereto, such that any telephone connections between the terminals A and B can be accomplished via this node 110. Specifically, according to one embodiment of the invention, the host resource 110 is adapted to set up a bi-directional primary connection between the first terminal A and the second terminal B after having routed the call. Preferably, a page signal P informs the second terminal B of the fact that the call has been routed to this terminal. The primary connection has a first leg L1 between the first terminal A and the host resource 110. The primary connection also has a second leg L2 between the host resource 110 and the second terminal B. In practice, the first and second legs L1 and L2 are preferably effected by means of connections Λ1 and Λ2 respectively, which reach the host resource 110 via the Internet.

Moreover, according to one preferred embodiment of the invention, the host resource 110 is adapted to receive a termination request from the second terminal B after having set up the connection between the terminals A and B. In response to such a request, the host resource 110 disconnects the second leg L2. Then, during a threshold period after having disconnected the second leg L2, the host resource 110 is adapted to maintain the first leg L1 (i.e. the first terminal A is placed on-hold). If a return call to a predefined telephone number is received from the second terminal B before expiry of the threshold period, the host resource 110 establishes a bi-directional secondary connection between the first terminal and the second terminal. This procedure will be further elucidated below with reference to FIG. 4.

The predefined telephone number, which is associated with first leg L1, may either be a fixed number for all the second terminal's B service requests to the system, or the number may be assigned on a call-by-call basis.

As mentioned above, one or both the networks α and β may be a wireless network, e.g. a cellular telephone network. In such a case, one or both of the first and second terminals may be A and B may be a wireless/mobile/cellular phone.

It is further advantageous if the host resource 110 has a processor 130 and includes, or is associated with, a computer readable medium 140 (e.g. a memory module) storing a program which is adapted to make processor 130 control the host resource 110 to effect the above-described procedures.

Figure 2:
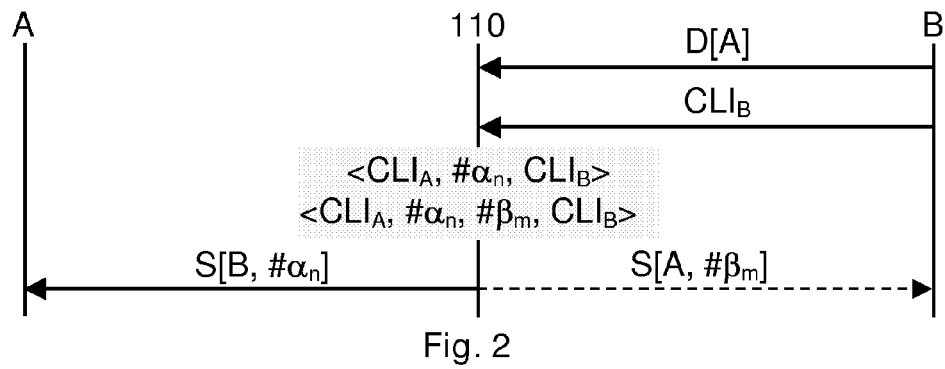
FIG. 2 shows a first node sequence diagram illustrating a proposed procedure for introducing a new user in the system.

FIG. 2 shows a node sequence diagram illustrating a proposed procedure for introducing a new user in the system. According to this procedure, the above-mentioned unique combination of the first common telephone number $\#\alpha_n$ and the first network identity $CLI_A$ is established. The procedure also invites the new user as a potential first terminal A in respect of telephone calls to a specific second terminal B. Consequently, at least one person having the terminal B at his/her disposal is typically likewise a subscriber to the operator of the host resource 110. This also means that any future calls from the terminal to the terminal B normally will be debited as collect calls to said subscriber. However, of course, alternative fee structures are also conceivable depending on applicable agreements between the involved network operators.

The procedure involves receiving an initial dialing instruction (or service request) D[A] from the second terminal B. The instruction D[A] contains data, which uniquely identifies the first terminal A, i.e. the intended future calling party. Hence, the instruction D[A] may specify a telephone number (or CLI). However, provided that the host resource 110 is associated with an adequate database (such as an on-line telephone catalog), the initial dialing instruction D[A] may instead designate a physical or legal person and/or an address. In any case, the first network identity $CLI_A$ is derived based on the initial dialing instruction D[A]. Of course, if the instruction D[A] contains an explicit network identity, or telephone number, this process becomes trivial.

The procedure also involves receiving user data specifying the second network identity $CLI_B$, which typically is a telephone number associated with second terminal B. Preferably, this data is forwarded automatically in the form of a CLI along with the initial dialing instruction D[A]. However, for instance if the call is made from a terminal being different from the intended second terminal B, the user data may be entered manually, for example by means of DTMF signaling, in response to prompting instructions from the host resource 110.

The first common telephone number $\#\alpha_n$ is then allocated based on the first and second network identities $CLI_A$ and $CLI_B$. The number $\#\alpha_n$ is however also allocated on the basis of any common telephone numbers $\#\alpha$ previously allocated to the first terminal A and/or the second terminal B, such that a combination of the first network identity $CLI_A$, the first common telephone number $\#\alpha_n$ and the second network identity $CLI_B$ becomes unique. An entry $<CLI_A, \#\alpha_n, CLI_B>$ representing this unique combination is stored, preferably in the database 120.

Thereafter, the host resource 110 sends a service invitation message $S[B, \#\alpha_n]$ to the first terminal A. The message $S[B, \#\alpha_n]$ includes data specifying an identity of the second terminal B, e.g. a name and/or an organization, and the first common telephone number $\#\alpha_n$ to be used for future calls to the terminal B.

In order to render a series of first common telephone number $\#\alpha_n$ stored in the database 120 as user-friendly and intuitive as possible, according to one preferred embodiment of the invention, the first common telephone numbers $\#\alpha_n$ are allocated as follows.

When the host resource 110 receives an initial dialing instruction D[A] from a particular second terminal B, it is investigated whether there exists an already stored entry in respect of the second terminal B. It is also investigated whether there exists an already stored entry in respect the first terminal A being identified by the instruction D[A].

If there is no previously stored entry in respect of any of the first terminal A and the second terminal B, the first common telephone number $\#\alpha_n$ is allocated by arbitrarily selecting one number from a predefined pool of telephone numbers in the first network $\alpha$;

if there exists at least one stored entry in respect of the second terminal B however there exists no stored entry in respect of the first terminal A, the first common telephone number $\#\alpha_n$ is allocated to a number being identical to one of the already stored first common telephone numbers; and If there exists at least one previously stored entry in respect of each of the originating and the second terminal A and B, the first common telephone number $\#\alpha_n$ is allocated to a number adjoining, incrementally or decrementally, an already stored first common telephone number in respect of the first terminal A.

This strategy results in that the first terminals A build up a respective unbroken series of first common telephone numbers $\#\alpha_n$. An exception must only be made in the statistically rare case when a first terminal A is invited by a second terminal $B_t$, which uses a specific first common telephone number $\#\alpha_n$ in the first network a, and the first terminal A has already been assigned this specific first common telephone number $\#\alpha_n$ as result of a previous invitation from another second terminal $B_j$.

As an alternative to the above-described procedure, the first unique combination $<CLI_A, \#\alpha_n, CLI_B>$ of the first common telephone number $\#\alpha_n$ and the first network identity $CLI_A$ may instead be established as follows.

First, an initial service request D[A] is received from the second terminal B, for example in the form of an SMS message (SMS=short message service), or an entry via a web page (uploaded or manually entered). In any case, the initial service request D[A] contains data uniquely identifying the first terminal A. User data specifying the second network identity $CLI_B$ is likewise received, e.g. as a CLI or a manual entry.

The first network identity $CLI_A$ (typically a telephone number) is then derived based on the initial service request D[A].

Thereafter, the host resource 110 allocates an identity-number pair $<CLI_A, \#\alpha_n, \#\beta_m, CLI_B>$ representing the first unique combination. However, in addition to the first unique combination, the identity-number pair also contains a second common telephone number ($\#\beta_m$) in the second home telephone network $\beta$. The second common telephone number $\#\beta_m$ being adapted to be used for routing a call from the second terminal B to the first terminal A based on a second unique combination of the second common telephone number $\#\beta_m$ and the second network identity $CLI_B$. Analogous to the first common telephone number $\#\alpha_n$, the second common telephone number $\#\beta_m$ is adapted to be shared among a second group of users in the second home telephone network $\beta$. Preferably, the host resource 110 is adapted to notify the second terminal B the second common telephone number $\#\beta_m$ via a return message $S[A, \#\beta_m]$, for example in the form of an SMS, specifying the number $\#\beta_m$ to be used for calling the first terminal A. In FIG. 2, this message is illustrated by means of a dashed arrow to the second terminal B. Given the respective local numbers, i.e. the first and second common telephone numbers $\#\alpha_n$ and $\#\beta_m$, calls may be set up at local rates in both directions between the first and second terminals A and B respectively.

Figure 3:
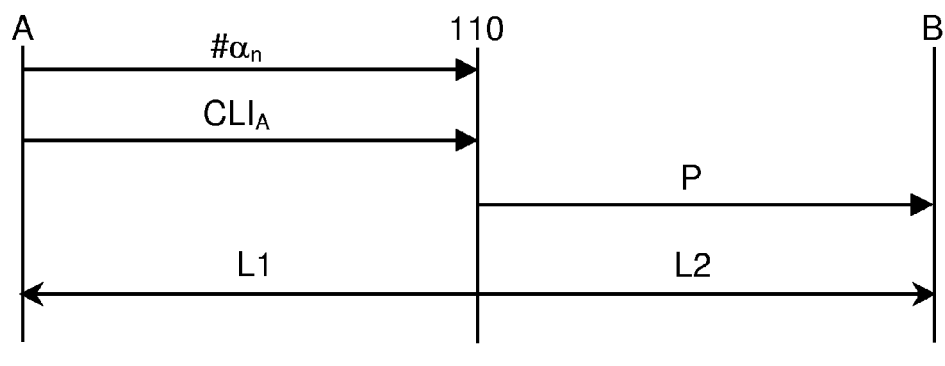
FIG. 3 shows a second node sequence diagram illustrating a proposed call setup procedure.

FIG. 3 shows a node sequence diagram illustrating a proposed procedure for setting up telephone connection between a first terminal A and a second terminal B via the host resource 110.

The procedure is initiated by receiving a dialing code from the first terminal A in the host resource 110 (as the result of a telephone number entered in the terminal A and being sent over the first home telephone network $\alpha$, and possibly one or more interconnecting networks N). The dialing code identifies a first common telephone number $\#\alpha_n$ in the first home telephone network $\alpha$, which number $\#\alpha_n$ is adapted to be shared among a first group of users in the first home telephone network $\alpha$. Thus, the first common telephone number $\#\alpha_n$ may be a switchboard number associated with the host resource 110.

The host resource 110 also receives user data specifying the first network identity $CLI_A$. Typically, this data is forwarded automatically along with dialing code $\#\alpha_n$ in the form of a CLI. However, according to one preferred embodiment of the invention, it is also possible to use this service from first terminals A having network identities that are not registered with the host resource 110. Namely, if a call is originated from such a terminal A, the host resource 110 will not find a matching entry in the database 120. As a result, the user of the non-registered first terminal A is prompted to enter a valid first network identity $CLI_A$, for example represented by his/her telephone number. Provided that a matching entry is found for this number, the host resource 110 routes the call to the second terminal B. Normally, this involves generating a page signal P. As mentioned earlier, the call is routed based on the unique combination of the first common telephone number #$\alpha_n$ and the first network identity $CLI_A$. Upon acceptance of the call (i.e. reception of a call-accept message, or off-hook, from the terminal B), a bi-directional primary connection is set up between the first terminal A and the second terminal B. This connection is here denoted L1 and L2, where L1 symbolizes a first leg between the first terminal A and the host resource 110; and L2 symbolizes a second leg between the host resource 110 and the second terminal B.

Figure 4:
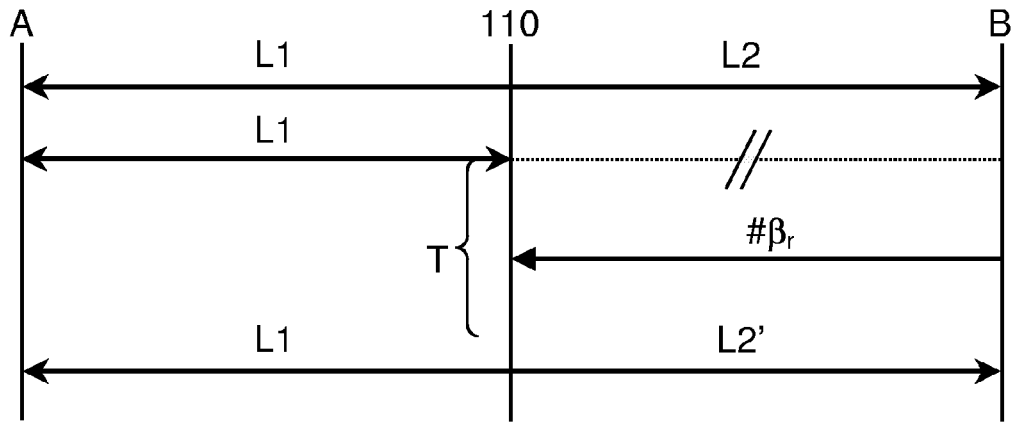
FIG. 4 shows a third node sequence diagram illustrating a reconnect procedure according to one preferred embodiment of the invention aiming to reduce the costs for the terminating subscriber.

FIG. 4 shows a node sequence diagram illustrating a reconnect procedure according to one preferred embodiment of the invention, which allows reduction of the costs for the terminating subscriber. As mentioned above, it can normally be expected that the terminating subscriber be charged a collect-call rate when receiving calls via the host resource 110 of the proposed system. For long distance calls, this rate may be relatively expensive. An incitement therefore exists to accomplish an alternative connection, which is associated with lower costs.

In FIG. 4, we assume that a two-legged L1, L2 bi-directional primary connection has been set up between the first terminal A and the second terminal B. According to one preferred embodiment of the invention, as soon as such a connection exists, the terminal B may disconnect the second leg L2, reconnect to the host resource 110 at a local-call rate, and reestablish the connection with the terminal A.

To this aim, the host resource 110 is specifically adapted to receive a termination request from the second terminal B after having set up the bi-directional primary connection L1, L2 between the terminals A and B. In response to such a request, the host resource 110 is further adapted to disconnect the second leg L2 while maintaining the first leg L1 during a threshold period T after having disconnected the second leg L2.

If a return call to a predefined telephone number #$\beta_r$ is received from the second terminal B before expiry of the threshold period T, the host resource 110 is adapted to set up a new second leg L2' and associate this leg with the first leg L1, such that a bi-directional secondary connection L1, L2' is established between the first terminal A and the second terminal B. Naturally, a precondition for this type of secondary connection L1, L2' is that no termination request has yet been received from the terminal A.

Figure 5:
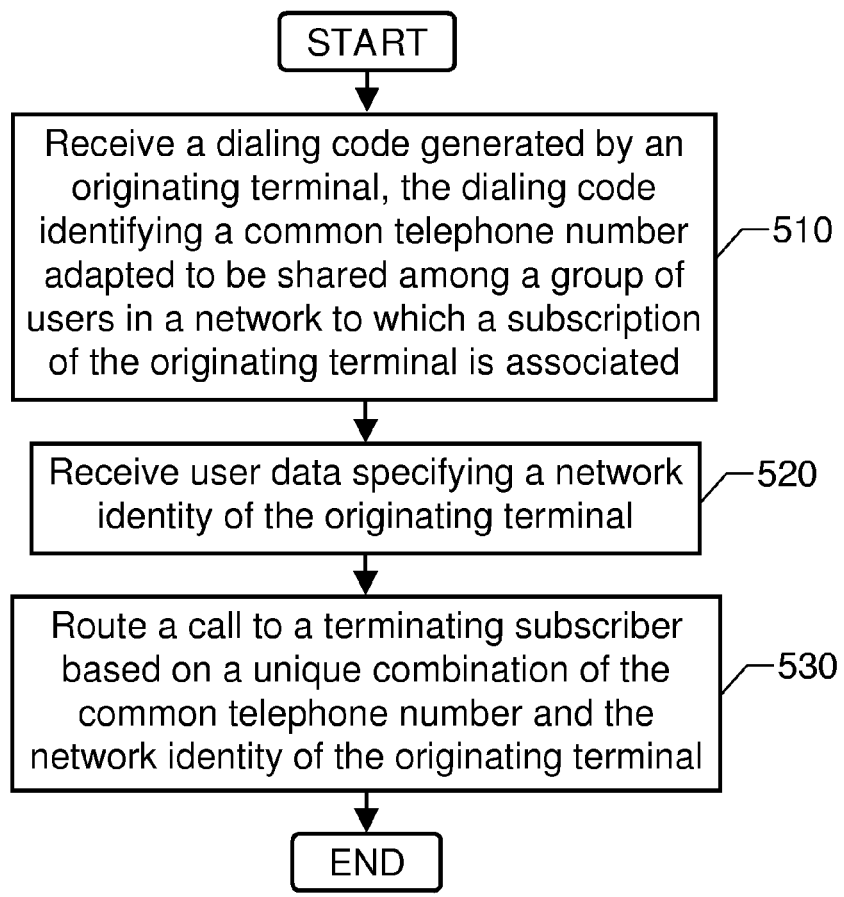
FIG. 5 illustrates, by means of a flow diagram, the general method of establishing a telephone connection according to the invention.

To sum up, we will now describe the general method of establishing a telephone connection according to the invention with reference to the flow diagram in FIG. 5.

An initial step 510 receives a dialing code from a first terminal. The dialing code identifies a common telephone number in a home telephone network of a first terminal. The common telephone number is adapted to be shared among a group of users in this home telephone network.

A following, or parallel step 520, receives user data specifying a first network identity of the first terminal. The combination of the first network identity and the common telephone number is unique, and designates a particular second terminal having a subscription in a home network different from the home network of the first terminal.

Subsequently, a step 530 routes a call from the first terminal to the designated second terminal. (i.e. based on the unique combination of the common telephone number and the first network identity).

All of the steps, as well as any sub-sequence of steps, described with reference to FIG. 5, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc), an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

For clarity reasons, the invention has here been described with reference to two home telephone networks $\alpha$ and $\beta$ respectively. Naturally, the proposed solution is also applicable to any number of such networks larger than two. Hence, any combination of two subscribers having their respective subscriptions with two mutually different network operators may be interconnected via the host resource 110.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia.

The invention is not restricted to the described embodiments in the figures, but may be varied freely within the scope of the claims.

The invention claimed is:

1. A system for establishing a telephone connection between a first terminal and a second terminal, the first terminal being associated with a subscription in a first home telephone network in which the first terminal is identified by means of a first network identity, and the second terminal being associated with a subscription in a second home telephone network in which the second terminal is identified by means of a second network identity, characterized in that the system comprises:
   a host resource comprising one or more memory storage areas and one or more processors, adapted to, with the one or more processors, route a call from the first terminal to the second terminal based on a first unique combination of the first network identity and a first common telephone number in the first home telephone network dialed by the first terminal, the first common telephone number being adapted to be shared among a first group of users in the first home telephone network, wherein the first unique combination of the first common telephone number and the first network identity is established by:
receiving an initial dialing instruction from the second terminal, the initial dialing instruction containing data uniquely identifying the first terminal,
receiving user data specifying the second network identity,
deriving the first network identity based on the initial dialing instruction,
allocating the first common telephone number based on the first and second network identities and any first common telephone numbers previously allocated to the first terminal and/or the second terminal in such a manner that a combination of the first network identity, the first common telephone number and the second network identity becomes unique,
storing an entry representing the first unique combination, and
sending a service invitation message to the first terminal, the service invitation message including data specifying an identity of the second terminal and the first common telephone number,
wherein the allocation of the first common telephone number comprises:
an investigation of whether there exists an already stored entry in respect of the second terminal,
an investigation of whether there exists an already stored entry in respect of the first terminal,
if no previously stored entry exists in respect of either the first terminal and the second terminal, the first common telephone number is allocated by an arbitrary selection of one number from a predefined pool of telephone numbers in the first network,
if there exists at least one stored entry in respect of the second terminal however there exists no stored entry in respect of the first terminal, the first common telephone number is allocated to a number which is identical to an already stored first common telephone number, and
if there exists at least one previously stored entry in respect of each of the first and the second terminal, the first common telephone number is allocated to an adjoining number, incrementally or decrementally, of an already stored first common telephone number in respect of the first terminal;
a first interface node connecting the first home telephone network to at least one interconnecting network, and
a second interface node connecting the second home telephone network to at least one of the at least one interconnecting network, wherein
at least one of the at least one interconnecting network is represented by a packet switched network, and each of the a first and second interface nodes is adapted to handle telephone traffic over packet switched networks.

2. The system according to claim 1, wherein the host resource is adapted to route calls from each of a first number of first terminals in the first home telephone network to each of a second number of second terminals in the second home telephone network, the host resource being associated with a database storing an entry for each first unique combination of:
the first network identity of each of the first terminals,
the second network identity of each of the second terminals, and
a respective first common telephone number to be dialed by each first terminal to reach each of the second terminals.

3. The system according to claim 1, wherein at least one of the at least one packet switched network is represented by the Internet.

4. The system according to claim 1, wherein, after having routed the call, the host resource is adapted to set up a bi-directional primary connection between the first terminal and the second terminal provided that a call-accept message is generated by the second terminal.

5. The system according to claim 4, wherein the primary connection comprises a first leg between the first terminal and the host resource and a second leg between the host resource and the second terminal, and the host resource is adapted to:
receive a termination request from the second terminal, and in response thereto disconnect the second leg,
maintain the first leg during a threshold period after having disconnected the second leg, and
establish a bi-directional secondary connection between the first terminal and the second terminal if a return call to a predefined telephone number is received from the second terminal before expiry of the threshold period.

6. The system according to claim 1, wherein at least one of the first and second home telephone networks is a wireless network.

7. A method of establishing a telephone connection between a first terminal and a second terminal, the first terminal being associated with a subscription in a first home telephone network in which the first terminal is identified by means of a first network identity and the second terminal being associated with a second home telephone network in which the second terminal is identified by means of a second network identity, characterized by
receiving a dialing code from the first terminal, the dialing code identifying a first common telephone number in the first home telephone network, the first common telephone number being adapted to be shared among a first group of users in the first home telephone network,
receiving user data specifying the first network identity, and
routing a call from the first terminal to the second terminal based on a first unique combination of the first common telephone number and the first network identity, wherein the first unique combination of the first common telephone number and the first network identity is established by:
receiving an initial dialing instruction from the second terminal, the initial dialing instruction containing data uniquely identifying the first terminal,
receiving user data specifying the second network identity,
deriving the first network identity based on the initial dialing instruction,
allocating the first common telephone number based on the first and second network identities and any first common telephone numbers previously allocated to the first terminal and/or the second terminal in such a manner that a combination of the first network identity, the first common telephone number and the second network identity becomes unique,
storing an entry representing the first unique combination, and
sending a service invitation message to the first terminal, the service invitation message including data specifying an identity of the second terminal and the first common telephone number;

wherein the allocation of the first common telephone number comprises:
  investigating whether there exists an already stored entry in respect of the second terminal,
  investigating whether there exists an already stored entry in respect of the first terminal,
  if no previously stored entry exists in respect of either the first terminal and the second terminal, the first common telephone number is allocated by arbitrarily selecting one number from a predefined pool of telephone numbers in the first network,
  if there exists at least one stored entry in respect of the second terminal however there exists no stored entry in respect of the first terminal, the first common telephone number is allocated to a number being identical to an already stored first common telephone number,
  if there exists at least one previously stored entry in respect of each of the first and the second terminal, the first common telephone number is allocated to a number adjoining, incrementally or decrementally, an already stored first common telephone number in respect of the first terminal; and
setting up a bi-directional primary connection between the first terminal and the second terminal provided that a call-accept message is generated by the second terminal, wherein the primary connection is established via at least on interconnecting network of packet switched type.

8. The method according to claim 7, wherein at least one of the at least one packet switched network is represented by the Internet.

9. The method according to claim 7, comprising:
receiving a termination request from the second terminal, and in response thereto:
  disconnecting the second leg,
  maintaining the first leg during a threshold period after having disconnected the second, and
  establishing a bi-directional secondary connection between the first terminal and the second terminal if a return call to a predefined telephone number is received from the second terminal before expiry of the threshold period.

10. The method according to claim 7, wherein the first unique combination of the first common telephone number and the first network identity is established by:
receiving an initial service request from the second terminal, the initial service request containing data uniquely identifying the first terminal,
receiving user data specifying the second network identity,
deriving the first network identity based on the initial service request, and
allocating an identity-number pair representing the first unique combination, the identity-number pair further containing a second common telephone number in the second home telephone network, the second common telephone number being adapted to:
  be used for routing a call from the second terminal to the first terminal based on a second unique combination of the second common telephone number and the second network identity and
  be shared among a second group of users in the second telephone network.

11. A computer program product for establishing a telephone connection between a first terminal and a second terminal, the first terminal being associated with a subscription in a first home telephone network in which the first terminal is identified by a first network identity, and the second terminal being associated with a subscription in a second home telephone network in which the second terminal is identified by a second network identity, the computer program product comprising at least one non-transitory computer-readable storage medium having computer-readable program code portions stored therein, the computer-readable program code portions comprising:
an executable portion configured to route a call from the first terminal to the second terminal based on a first unique combination of the first network identity and a first common telephone number in the first home telephone network dialed by the first terminal, the first common telephone number being adapted to be shared among a first group of users in the first home telephone network,
wherein the first unique combination of the first common telephone number and the first network identity is established by:
receiving an initial dialing instruction from the second terminal, the initial dialing instruction containing data uniquely identifying the first terminal,
receiving user data specifying the second network identity,
deriving the first network identity based on the initial dialing instruction,
allocating the first common telephone number based on the first and second network identities and any first common telephone numbers previously allocated to the first terminal and/or the second terminal in such a manner that a combination of the first network identity, the first common telephone number and the second network identity becomes unique,
storing an entry representing the first unique combination, and
sending a service invitation message to the first terminal, the service invitation message including data specifying an identity of the second terminal and the first common telephone number, wherein the allocation of the first common telephone number comprises:
an investigation of whether there exists an already stored entry in respect of the second terminal,
an investigation of whether there exists an already stored entry in respect of the first terminal,
if no previously stored entry exists in respect of either the first terminal and the second terminal, the first common telephone number is allocated by an arbitrary selection of one number from a predefined pool of telephone numbers in the first network,
if there exists at least one stored entry in respect of the second terminal however there exists no stored entry in respect of the first terminal, the first common telephone number is allocated to a number which is identical to an already stored first common telephone number, and
if there exists at least one previously stored entry in respect of each of the first and the second terminal, the first common telephone number is allocated to an adjoining number, incrementally or decrementally, of an already stored first common telephone number in respect of the first terminal;
an executable portion configured to connect the first home telephone network to at least one interconnecting network, and
an executable portion configured to connect the second home telephone network to at least one of the at least one interconnecting network, wherein
at least one of the at least one interconnecting network is represented by a packet switched network, and each of the a first and second interface nodes is adapted to handle telephone traffic over packet switched networks.

12. A non-transitory computer readable medium, having a program recorded thereon for establishing a telephone connection between a first terminal and a second terminal the first terminal being associated with a subscription in a first home telephone network in which the first terminal is identified by a first network identity, and the second terminal being associated with a subscription in a second home telephone network in which the second terminal is identified by a second network identity, where the program is to make a computer at least:

route a call from the first terminal to the second terminal based on a first unique combination of the first network identity and a first common telephone number in the first home telephone network dialed by the first terminal the first common telephone number being adapted to be shared among a first group of users in the first home telephone network, wherein the first unique combination of the first common telephone number and the first network identity is established by:

receiving an initial dialing instruction from the second terminal, the initial dialing instruction containing data uniquely identifying the first terminal, receiving user data specifying the second network identity, deriving the first network identity based on the initial dialing instruction, allocating the first common telephone number based on the first and second network identities and any first common telephone numbers previously allocated to the first terminal and/or the second terminal in such a manner that a combination of the first network identity, the first common telephone number and the second network identity becomes unique, storing an entry representing the first unique combination, and sending a service invitation message to the first terminal, the service invitation message including data specifying an identity of the second terminal and the first common telephone number, wherein the allocation of the first common telephone number comprises:

an investigation of whether there exists an already stored entry in respect of the second terminal, an investigation of whether there exists an already stored entry in respect of the first terminal, if no previously stored entry exists in respect of either the first terminal and the second terminal the first common telephone number is allocated by an arbitrary selection of one number from a predefined pool of telephone numbers in the first network, if there exists at least one stored entry in respect of the second terminal however there exists no stored entry in respect of the first terminal the first common telephone number is allocated to a number which is identical to an already stored first common telephone number, and if there exists at least one previously stored entry in respect of each of the first and the second terminal the first common telephone number is allocated to an adjoining number, incrementally or decrementally, of an already stored first common telephone number in respect of the first terminal;

connect the first home telephone network to at least one interconnecting network and, connect the second home telephone network to at least one of the at least one interconnecting network, wherein at least one of the at least one interconnecting network is represented by a packet switched network, and each of the a first and second interface nodes is adapted to handle telephone traffic over packet switched networks.

\* \* \* \* \*

UNITED STATES PATENT AND TRADEMARK OFFICE
CERTIFICATE OF CORRECTION

PATENT NO. : 8,374,168 B2
APPLICATION NO. : 12/300278
DATED : February 12, 2013
INVENTOR(S) : Winbladh et al.

It is certified that error appears in the above-identified patent and that said Letters Patent is hereby corrected as shown below:

In the Claims:

Column 13

Line 37, "having disconnected the second, and" should read --having disconnected the second leg, and--

Signed and Sealed this
Seventh Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,374,168 B2  Page 1 of 1
APPLICATION NO. : 12/300278
DATED : February 12, 2013
INVENTOR(S) : Winbladh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1130 days.

Signed and Sealed this
First Day of September, 2015

Michelle K. Lee
*Director of the United States Patent and Trademark Office*